US006847931B2

(12) United States Patent
Addison et al.

(10) Patent No.: US 6,847,931 B2
(45) **Date of Patent: *Jan. 25, 2005**

(54) EXPRESSIVE PARSING IN COMPUTERIZED CONVERSION OF TEXT TO SPEECH

(75) Inventors: Edwin R. Addison, Millersville, MD (US); H. Donald Wilson, White Plains, NY (US); Gary Marple, Boxborough, MA (US); Anthony H. Handal, Westport, CT (US); Nancy Krebs, Severn, MD (US)

(73) Assignee: Lessac Technology, Inc., White Plains, NY (US)

( * ) Notice: Subject to any disclaimer, the term of this patent is extended or adjusted under 35 U.S.C. 154(b) by 391 days.

This patent is subject to a terminal disclaimer.

(21) Appl. No.: 10/061,078

(22) Filed: Jan. 29, 2002

(65) Prior Publication Data

US 2003/0144842 A1 Jul. 31, 2003

(51) Int. Cl.[7] .................... G01L 13/04
(52) U.S. Cl. .................... 704/260; 704/266
(58) Field of Search .................... 704/260, 261, 704/266

(56) References Cited

U.S. PATENT DOCUMENTS

| | | | |
|---|---|---|---|
| 4,783,803 | A | 11/1988 | Baker et al. |
| 4,866,778 | A | 9/1989 | Baker |
| 4,903,305 | A | 2/1990 | Gillick et al. |
| 5,010,495 | A | 4/1991 | Willetts |
| 5,027,406 | A | 6/1991 | Roberts et al. |
| 5,231,670 | A | 7/1993 | Goldhor et al. |
| 5,393,236 | A | 2/1995 | Blackmer et al. |
| 5,487,671 | A | 1/1996 | Shpiro et al. |
| 5,636,325 | A | 6/1997 | Farrett |
| 5,679,001 | A | 10/1997 | Russel et al. |
| 5,717,828 | A | 2/1998 | Rothenberg |
| 5,728,960 | A | 3/1998 | Sitrick |
| 5,745,873 | A | 4/1998 | Braida et al. |

(List continued on next page.)

FOREIGN PATENT DOCUMENTS

| | | |
|---|---|---|
| GB | 2323693 | 9/1998 |
| WO | WO 0182291 | 11/2001 |

OTHER PUBLICATIONS

U.S. Appl. No. 09/553,810, filed Apr. 21, 2000.

*Primary Examiner*—Richemond Dorvil
*Assistant Examiner*—Abul K. Azad
(74) *Attorney, Agent, or Firm*—Kirkpatrick & Lockhart LLP; Anthony H. Handal

(57) ABSTRACT

A preferred embodiment of the method for converting text to speech using a computing device having a memory is disclosed. Text, being made up of a plurality of words, is received into the memory of the computing device. A plurality of phonemes are derived from the text. Each of the phonemes is associated with a prosody record based on a database of prosody records associated with a plurality of words. A first set of the artificial intelligence rules is applied to determine context information associated with the text. The context influenced prosody changes for each of the phonemes is determined. Then a second set of rules, based on Lessac theory to determine Lessac derived prosody changes for each of the phonemes is applied. The prosody record for each of the phonemes is amended in response to the context influenced prosody changes and the Lessac derived prosody changes. Then a reading from the memory sound information associated with the phonemes is performed. The sound information is amended, based on the prosody record as amended in response to the context influenced prosody changes and the Lessac derived prosody changes to generate amended sound information for each of the phonemes. Then the sound information is outputted to generate a speech signal.

40 Claims, 5 Drawing Sheets

U.S. PATENT DOCUMENTS

| | | | |
|---|---|---|---|
| 5,766,015 | A | 6/1998 | Shpiro |
| 5,787,231 | A | 7/1998 | Johnson et al. |
| 5,791,904 | A | 8/1998 | Russel et al. |
| 5,796,916 | A | 8/1998 | Meredith |
| 5,799,279 | A | 8/1998 | Gould et al. |
| 5,850,627 | A | 12/1998 | Gould et al. |
| 5,864,805 | A | 1/1999 | Chen et al. |
| 5,870,809 | A | 2/1999 | Nishi |
| 5,903,864 | A | 5/1999 | Gadbois et al. |
| 5,909,666 | A | 6/1999 | Gould et al. |
| 5,920,837 | A | 7/1999 | Gould et al. |
| 5,946,654 | A | 8/1999 | Newman et al. |
| 5,960,394 | A | 9/1999 | Gould et al. |
| 6,055,498 | A | 4/2000 | Neumeyer et al. |
| 6,071,123 | A | 6/2000 | Tallal et al. |
| 6,081,780 | A | 6/2000 | Lumelsky |
| 6,144,939 | A | 11/2000 | Pearson et al. |
| 6,188,984 | B1 | 2/2001 | Manwaring et al. |
| 6,249,763 | B1 | 6/2001 | Minematsu |
| 6,253,182 | B1 | 6/2001 | Acero |
| 6,266,637 | B1 | 7/2001 | Donovan et al. |

EXPRESSIVE PARSING IN COMPUTERIZED CONVERSION OF TEXT TO SPEECH

BACKGROUND OF THE INVENTION

While speech to text applications have experienced a remarkable evolution in accuracy and usefulness during the past ten or so years, pleasant, natural sounding easily intelligible text to speech functionality remains an elusive but sought-after goal.

This remains the case despite what one might mistake as the apparent simplicity of converting known syllables with known sounds into speech, because of the subtleties of the audible cues in human speech, at least in the case of certain languages, such as English. In particular, while certain aspects of these audible cues have been identified, such as the increase in pitch at the end of a question which might otherwise be declaratory in form, more subtle expressions in pitch and energy, some speaker specific, some optional and general in nature, and still others word specific, combine with individual voice color in the human voice to result in realistic speech.

In accordance with the invention, elements of individual speaker color, randomness, and so forth are incorporated into output speech with varying degrees of implementation, to achieve a pseudo-random effect. In addition, speaker color is integrated with the same and combined with expressive models patterned on existing conventional speech coach to student voice training techniques. Such conventional techniques may include the Lessac system, which is aimed at improving intelligibility in the human voice in the context of theatrical and similar implementations of human speech.

In contrast to the inventive approach, conventional text to speech technology has concentrated on a mechanical, often high information density, approach. Perhaps the most convincing text to speech approach is the use of prerecorded entire phrases, such as those used in some of the more sophisticated telephone answering applications. An example of such an application is Wildfire (a trademark), a proprietary system available in the United States. In such systems, the objective is to minimize the number of dialog options in favor of prerecorded phrases with character, content and tonality having a nature which is convincing from an expressive standpoint. For example, such systems on recognizing an individual's voice and noting a match to the phone number might say: "Oh, hello Mr. Smith", perhaps with an intonation of pleasure or surprise. On the other hand, if a voice recognition software in the system determines that the voice is not likely that of Mr. Smith, despite the fact that it has originated from his telephone line, the system may be programmed to say: "Is that you, Mr. Smith?", but in an inquisitive tone. In the above examples, the above phrase spoken by a human speaker is recorded in its entirety. However, the amount of memory required for just a very few responses is relatively high and versatility is not a practical objective.

Still another approach is so-called "phrases placing" such as that disclosed in Donovan, U.S. Pat. No. 6,266,637, where recorded human speech in the form of phrases is used to construct output speech. In addition, in accordance with this technology, the characteristics of segments of speech may be modified, for example by modifying them in duration, energy and pitch. In related approaches, such as utterance playback, some of the problems of more limited systems are solved, such approaches tend to be both less intelligible and less natural than human speech. To a certain extent blending of prerecorded speech with synthetic speech will also solve some of these problems, but the output speech, while versatile and having wider vocabularies, is still relatively mechanical and character.

Still another approach is to break up speech into its individual sounds or phonemes, and then to synthesize words from these sounds. Such phonemes may be initially recorded human speech, but may have their characteristics varied so that the resulting phoneme has a different duration, pitch, energy or other characteristics or characteristics changed as compared to the original recording. Still another approach is to make multiple recordings of the phonemes, or integrate multiple recordings of words with word generation using phoneme building blocks.

Still a further refinement is the variation of the prosody, for example by independently changing the prosody of a voiced component and an unvoiced component of the input speech signal, as is taught by U.S. Pat. No. 6,253,182 of Acero. In addition, the frequency-domain representation of the output audio may be changed, as is also described in Acero.

Concatenative systems generate human speech by synthesizing together small speech segments to output speech units from the input text. These output speech units are then concatenated, or played together to form the final speech output by the system. Speech may be generated using phonemes, diphones (two phonemes) or triphones (three phonemes). In accordance with the techniques described by Acero, the prosody of the speech unit, defined by its pitch and duration, may be varied to convey meaning, such as in the increase in pitch at the end of a question.

Still other text to speech technology involves the implementation of technical pronunciation rules in conjunction with the text to speech transformation of certain combinations of certain consonants and/or vowels in a certain order. See for example U.S. Pat. No. 6,188,984 of Manwaring et al. One aspect of this approach is recognizing the boundaries between syllables and applying the appropriate rules.

As can be seen from the above, current approaches for text to speech applications proceed at one end of the spectrum from concatenated sentences, phrases and words to word generation using phonemes. While speech synthesis using sub-word units lends itself to large vocabularies, serious problems occur where sub-word units are spliced. Nevertheless, such an approach appears, at this time, to constitute the most likely model for versatile high vocabulary text to speech systems. Accordingly, addressing prosody issues is a primary focus. For example, in U.S. Pat. No. 6,144,939 of Pearson, the possibility of a source-filter model that closely ties the source and filter synthesizer components to physical structures within the human vocal tract is suggested. Filter parameters are selected to model vocal tract effects, while source waveforms model the glottal source. Pearson is concerned, apparently, with low memory systems, to the extent that full syllables are not even stored in the system, but rather half syllables are preferred. Interestingly, this approach mimics the Assyro-Babylonian alphabet approach which involved use of consonants with various vowel additions respectively before and after each consonant corresponding to sounds represented by individual alphabets.

SUMMARY OF THE INVENTION

A method for converting text to speech using a computing device having memory is disclosed. A text is received into the memory of the computing device. A set of the lexical parsing rules are applied to parse the text into a plurality of components. Pronunciation, and meaning information is associated with these components. A set of phrase parsing rules are used to generate marked up text. The marked up text is then phonetically parsed using phonetic parsing rules, and Lessac expressive parsing rules. The sounds are then stored in the memory of the computing device, each of the sounds being associated with pronunciation information. The sounds associated with the text maybe recalled to generate a raw speech signal from the marked up text after the parsing using phonetic and expressive parsing rules.

In a preferred embodiment of the method for converting text to speech using a computing device having a memory is disclosed. Text, being made up of a plurality of words, is received into the memory of the computing device. A plurality of phonemes are derived from the text. Each of the phonemes is associated with a prosody record based on a database of prosody records associated with a plurality of words. A first set of the artificial intelligence rules is applied to determine context information associated with the text. The context influenced prosody changes for each of the phonemes is determined. Then a second set of rules, based on Lessac theory to determine Lessac derived prosody changes for each of the phonemes is applied. The prosody record for each of the phonemes is amended in response to the context influenced prosody changes and the Lessac derived prosody changes. Then a reading from the memory sound information associated with the phonemes is performed. The sound information is amended, based on the prosody record as amended in response to the context influenced prosody changes and the Lessac derived prosody changes to generate amended sound information for each of the phonemes. Then the sound information is outputted to generate a speech signal.

It is further disclosed that the prosody of the speech signal is varied to increase the realism of the speech signal. Further, the prosody of the speech signal can be varied in a manner which is random or which appears to be random, further increasing the realism.

The sound information is associated with different speakers, and a set of artificial intelligence rules are used to determine the identity of the speaker associated with the sound information that is to be output.

Additionally, the prosody record can be amended in response to the context influenced prosody changes, based on the words in the text and their sequence. The prosody record can also be amended in response to the context influenced prosody changes, based on the emotional context of words in the text. When these prosody changes are combined with varied prosody of the speech signal, sometimes varied in a manner that appears random, realism is further increased.

The sound information generated is associated with different speakers, and a set of artificial intelligence rules are used to determine the identity of the speaker associated with the sound information that is to be output. Further, the prosody record can be amended in response to the context influenced prosody changes, based on the words in the text and their sequence.

BRIEF DESCRIPTION OF THE DRAWINGS

The function, objects and advantages of the invention will become apparent from, the following description taken in conjunction with the drawings which illustrated only several embodiments of the invention, and in which.

DETAILED DESCRIPTION OF THE BEST MODE

In accordance with the present invention, an approach to voice synthesis aimed to overcome the barriers of present system is provided. In particular, present day systems based on pattern matching, phonemes, di-phones and signal processing result in "robotic" sounding speech with no significant level of human expressiveness. In accordance with one embodiment of this invention, linguistics, "N-ary phones", and artificial intelligence rules based, in large part, on the work of Arthur Lessac are implemented to improve tonal energy, musicality, natural sounds and structural energy in the inventive computer generated speech. Applications, of the present invention include customer service response systems, telephone answering systems, information retrieval, computer reading for the blind or "hands busy" person, education, office assistance, and more.

Current speech synthesis tools are based on signal processing and filtering, with processing based on phonemes, diphones and/or phonetic analysis. Current systems are understandable, but largely have a robotic, mechanical, mushy or nonhuman style to them. In accordance with the invention, speech synthesis is provided by implementing inventive features meant to simulate linguistic characteristics and knowledge-based processing to develop a machine-implementable model simulating human speech by implementing human speech characteristics and a pseudo-natural text to speech model.

There are numerous systems on the market today. While this would seem to validate an existing need for natural sounding text to speech systems, most current text to speech systems are based on old paradigms including pattern recognition and statistical processing, and achieving the less than desirable performance noted above. The same may include so-called "Hidden Markov Models" for identifying system parameters, and determining signal processing.

Figure 1:
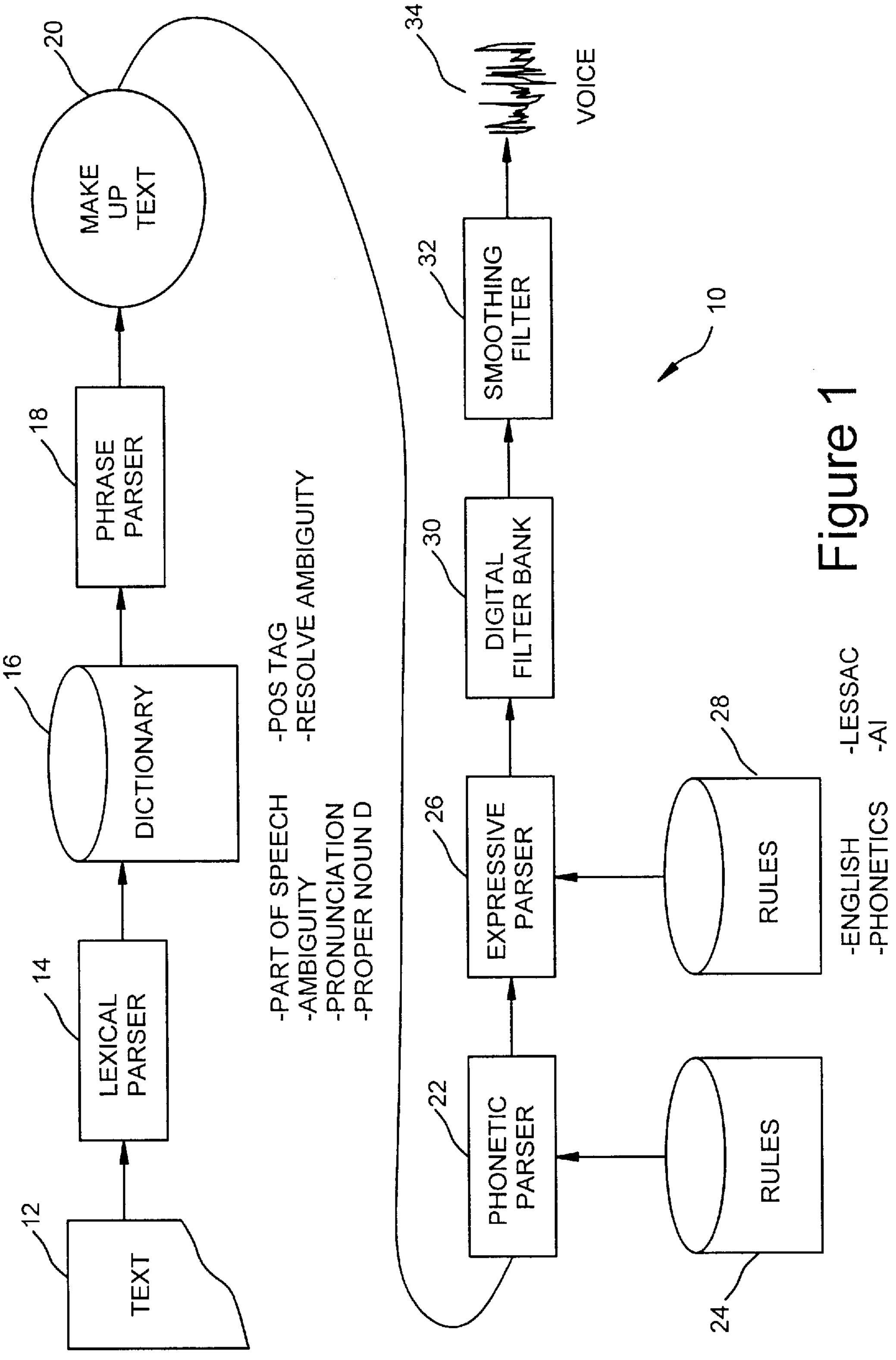
FIG. 1 illustrates a text to speech system in accordance with the present invention.

Referring to FIG. 1, the inventive system 10 begins processing with a file or record of text 12. Lexical parsing is then implemented at step 14. The first task is referred to below as tokenization. In accordance with the invention, tokenization is used to extract a word and punctuation list in sequential order from the text. The result is a word list and this word list is then processed using dictionary information at step 16. Processing includes looking up for each word: possible parts of speech which it may constitute, depending upon context, possible ambiguity, and possible word combinations in various idiomatic phrases, which are all contained in the dictionary consulted by the system at step 16. Following dictionary look up at step 16, a phrase parser identifies the end of each phrase at step 18, removes lexical ambiguity and labels each word with its actual part of speech. Tokenization is completed with the generation of marked up text at step 20.

The process of tokenization constitutes producing a word list for input text in a file or record being transformed into speech in accordance with the present invention. For example, in the question: "Mr. Smith, are you going to New York on June 5?", the output of the first part of the tokenizing operation appears as:

Mr., Smith, [comma], are, you, going, to, New, York, on, June, 5, [?]

After dictionary lookup at step 16 (as described in greater detail below), this same expression is represented as:

Mister Smith, [comma], are, you, going, to, New York, on, June fifth, [?]

It is noted that the proper name "Mister Smith" is grouped as a single token even though it has more than one word. The same is true of "June 5" which is a date. The "?" is included as a token because it has special implications about prosody, including pitch and tonal expression, to be accounted for later in the text to speech processing.

In accordance with the invention, each word is then decomposed by a phonetic parser at step 22 into phonemes, di-phones or "M-ary" phonemes, as appropriate based on rules contained within a database, containing English language and English phonetics rules. The output of this database is provided at step 24.

In addition to the application of rules at step 24, the system also implements an expressive parser at step 26. Expressive parsing is done at step 26 with the aid of rules processing based on Lessac voice coaching system theory which are obtained from a database at step 28. In particular, the system identifies such things as consonant "drumbeats", whether or not they are voiced, tonal energy locations in the word list, structural "vowel" sounds within the words, and various "connectives".

Other pragmatic pattern matching rules are applied to determine such things as speaker identity, emotion, emphasis, speed, pitch, and the like as will be discussed in detail below. The resulting "phoneme" list is passed into a digital filter bank where the audio stream for a given phoneme is looked up in a database, filtered using digital filters, at step 30, whose parameters are determined by the previous rule processing, and finally "smoothed" prior to outputting the audio to the speakers. For the smoothing may be achieved through the use of a smoothing filter at step 32 which, at step 34, outputs a voice signal.

In accordance with the invention, a dictionary is used on an interactive basis by the system. The contents of any existing dictionary, such as the American Heritage Dictionary, may be employed and stored in the system in any suitable form, such as the hard drive, RAM, or combinations of the same. Such a dictionary database is consulted by the system during operation of the text to speech engine. The dictionary databases applications, should contain information on spelling, part of speech, and pronunciation as well as a commonly occurring proper name list, geographical name list and the like. It further must represent ambiguous parts of speech. Other items which are required include common idioms and full spellings for abbreviations or numerical tokens, as well as other information in the form of algorithms for determining such things as speaker identity, paragraph and page numeration, and the like which one may not desire to turn into speech in every instance.

Thus, dictionary lookup will do such things as recognize "John Smith" to a single token rather than two separate words for grammatical purposes. Nevertheless, the system will treat the same as two words for speech purposes. Likewise, "Jun. 5, 2001" must be treated as a single date token for grammatical purposes, but represented as "June fifth, two thousand and one" for speech purposes. This will take a special date algorithm. "Run" is a single word with multiple meanings. Thus, it is necessary for the dictionary to list for each word, all the possible parts of speech of which that word may take the form. "Dr." must be represented as "doctor" for future speech processing. "Antarctica" must carry the dictionary pronunciation. However, in addition to such things as the above, the quality of the output, in accordance with the invention, involves the inclusion of Lessac consonant energy rules processing and other Lessac rules, as will be described in detail below. Generally the inventive approach is to treat each consonant energy sound as a "time domain Dirac delta function" spread by a functional factor related to the specific consonant sound.

A phrase parser is a rule production system or finite state automated processor that uses part of speech as a word matching criteria. The output is a phrase labeled with roles of word whose function in the sentence has been identified (such as subject of verb v, verb, object, object of prepositional phrase modifying x, adjective modifying noun y). A prior art phrase parser may be employed in accordance with the invention, modified to implement the various criteria defined herein. In accordance with the invention, a simple phrase parser may be used to identify the phrase boundaries and the head and modifier words of each phrase. This is useful in determining appropriate pauses in natural speech.

Many speech synthesis systems use a phonetic parser that breaks a word into its component spoken sounds. The inventive speech synthesis system also uses a phonetic parser, but the output of the phonetic parser is used to implement the Lessac rules, as described below.

In accordance with the preferred embodiment of the invention, this will be accomplished by generating three tokens for each word. The tokens are sent to the Lessac rules processor, as described below. The first is the English word. Normally this is taken directly from the text, but sometimes it must be generated. Examples above showed how "doctor" must replace "Dr." and "fifth" must replace the number "5" in a date expression. The second token is the English dictionary provided phonetic description of the word. This is used as a matter of convenience and reference for future processing and filtering. The third token to be output to the Lessac rules processor is the output of a standard phonetic parser. For example, the word "voice" may provide sounds corresponding sequentially to the alphabetical representations [V], [OI] and [S].

In accordance with a preferred embodiment of the invention, Lessac rule processing is a core component, where the work of Arthur Lessac is implemented in the processing. Lessac rules scan the marked up text and choose a particular audio frame or audio transition frame for spoken expression. Lessac rules may also identify pitch, speed or potency (volume). A few examples are given below. A full compilation of Lessac rules are found in the literature. Particular reference is made to Arthur Lessac's book, The Use and Training of the Human Voice, published by Drama Book Publishers in 1967. Lessac rules operate on the tokens provided to them by the phonetic parser.

In accordance with Lessac theory, consonant energy is associated conceptually with the symphony orchestra. In particular, in the Lessac "orchestra" musical instruments are associated with consonant sounds. The Lessac rules for consonant energy identify one or more musical instrument audio characteristics with each consonant portion of each word. The rules in Lessac theory correspond largely to the markings in his text and the selection of the sound (i.e. the "z bass fiddle"). For example, in the phrase "His home was wrecked", the Lessac consonant energy rules would identify the first and second 's' as a "z bass fiddle", the 'm' as a "m viola" and the "ck" followed by 'd' as a "KT double drumbeat". In other situations, "n" is a violin. Each of these instruments associated sounds, in turn, will have stored audio signals ripe for subsequent filtering processing.

Classical Lessac teaching relies upon the building of a mental awareness of music as an essential component of speech and introducing this into the consciousness of the student while he is speaking, resulting in the student articulating a mode of speech informed by the desired and associated Lessac musicality objectives.

Lessac implementation in accordance with the present invention takes the form of both including in the database of sounds for playback sounds which have well-defined Lessac implementations (i.e. follow the rules prescribed by Arthur Lessac to obtain proper intelligible pronunciation), and takes the form of selecting particular sounds depending upon the sequence of phonemes identified in word syllables found in the input text, which is to be transformed into speech.

In accordance with Lessac theory, the student is taught the concept of tonal energy by being shown how to experience the sensation of vocal vibrations.

In accordance with the invention, it is believed that when the voice is properly used, the tones are consciously transmitted through the hard palate, the nasal bone, the sinuses and the forehead. These tones are transmitted through bone conduction. There are certain sounds which produce more sensation than others. For example, consider the sound of the long "e"y as in "it's ea sy". This "Y Buzz" can be stored as an auditory hum "e"-y "ea-sy."

In accordance with the invention, it is believed that when the voice is properly used, the tones are consciously transmitted through the hard palate, the nasal bone, the sinuses and the forehead. These tones are transmitted through bone conduction., There are certain sounds which produce more sensation than others. For example, consider the sound of the long "e"y as in "it's ea sy". This "Y Buzz" can be stored as an auditory hum which can be used as an audio pattern for voice synthesis. The sound of the second "a" in "away" is also considered a concentrated tone, known as a "+Y Buzz" in accordance with Lessac theory. Other sounds are concentrated vowels and diphthongs, such as the long "o" as in "low". Open sounds using a "yawn stretch" facial posture create bone conducted tones coursing through the bony structures, allowing the voice to become rich, dynamic, and full of tonal color, rather than tinny, nasal and strident. In a "yawn stretch" the face assumes a forward facial posture. This forward facial posture can be better understood if one pictures a reversed megaphone, starting as an opening at the lips and extending with greater and greater size in the interior of the mouth. One would commonly make this sound if one said the word "Oh" with surprise.

Structural energy has been described by Lessac through the use of a numbering system, utilizing an arbitrary scale of 1 to 6, corresponding to the separation between lips during spoken language, and in particular the pronunciation of vowels and diphthongs. The largest lip opening is a 6 for words like "bad" and the smallest is a 1 for words like "booze". Table 1 briefly illustrates the numbering system, which is described in great detail in Lessac's works. In accordance with the invention, the Lessac rules are used to quantify each major vowel sound and use the same to activate stored audio signals.

TABLE 1

| #1 | #2 | #3 | #4 | #5 | #5.5 | #6 |
|---|---|---|---|---|---|---|
| Ooze | Ode | All | Odd | Alms | Ounce | Add |
| Boon | Bone | Born | Bond | Bard | Bound | Banned |
| Booed | Abode | Bawdy | Body | Barn | Bowed | Bad |

Lessac identifies a number of the ways that words in spoken language are linked, for example the Lessac "direct link". On the other hand, if there are two adjacent consonants, made in different places in the mouth, such as a "k" followed by a "t", the "k" would be fully 'played', meaning completed before moving on to the "t". This is known as "play and link". A third designation would be when there are two adjacent consonants made in the same place in the mouth—or in very close proximity—such as a "b" followed by another "b" or "p" as in the case of "grab boxes" or "keep back". In this case, the first consonant, or "drumbeat" would be prepared, meaning not completed, before moving on the second drumbeat, so there would simply be a slight hesitation before moving on to the second consonant. This is called "prepare and link". In accordance with the invention, rules for these situations and other links that Lessac identifies are detailed in his book "The Training of the Human Voice".

The operation of the invention may be understood, for example, from the word "voice". The word "voice" receives three tokens from the phonetic parser. These may be: [voice], [V OI S], and [vois].

The Lessac rules processor then outputs the sequence of sounds in Lessac rule syntax as follows for "voice":

V-Cello, 3-Y Buzz, S (unvoiced)

According to the invention, incorporation of "pragmatic" rules is used to enable the achievement of more realistic spoken voice in a text to speech system. Pragmatic rules encapsulate contextual and setting information that can be expressed by modification of voice filtering parameters. Examples of pragmatic rules are rules which look to such features in text as the identity of the speaker, the setting the part of speech of a word and the nature of the text.

For example, of the inventive system may be told, or using artificial intelligence may attempt to determine, whether the speaker is male or female. The background may be made quiet or noisy, and a particular background sound selected to achieve a desired effect. For example, white noise may lend an air of realism. If the text relates to the sea, artificial intelligence may be used to determine this based on the contents of the text and introduce the sound of waves crashing on a boulder-strewn seashore. Artificial intelligence can also be used in accordance with a present invention to determine whether the text indicates that the speaker is slow and methodical, or rapid. A variety of rules, implemented by artificial intelligence where appropriate, or menu choices along these lines, are made available as system parameters in accordance with a preferred embodiment of the invention.

In accordance with the invention, punctuation and phrase boundaries are determined. Certain inflection, pauses, or accenting can be inferred from the phrase boundaries and punctuation marks that have been identified by known natural language processing modules. These pragmatic rules match the specific voice feature with the marked up linguistic feature from prior processing. Examples may be to add pauses after commas, longer pauses after terminal sentence punctuation, pitch increases before question marks and on the first word of sentences ending with a question mark, etc. In some cases, an identified part of speech may have an impact on a spoken expression, particularly the pitch associated with the word.

Artificial intelligence may also be used, for example, in narrative text to identify situations where there are two speakers in conversation. This may be used to signal the system to change the speaker parameters each time the speaker changes.

As alluded to above, in accordance with the invention, stored audio signals are accessed for further processing based on the application of Lessac rules or other linguistic rules. At this point in the speech processing, a stored database or "dictionary" of stored phonemes, diphones and M-ary phonemes is used to begin the audio signal processing and filtering. Unlike prior systems that tend to exclusively use phonemes, or diphones, the inventive system stores phonemes, diphones, and M-ary phonemes all together, choosing one of these for each sound based on the outcome of the Lessac and linguistic rules processing.

For example, structural energy symbols from Lessac's book, as published in 1967 (second edition) at pages 71 correspond to some of these sounds, and are identified as structural energy sounds #1, #21, #3, #4, #5, #51, and #6. On page 170–171 of the new third edition of the text, published in 1997, ague more symbols/sounds are headed to complete the group: 3y, 6y and the R-derivative sound. These correspond to the shape of the mouth and lips and may be mapped to the sounds as described by Lessac.

In the treatment of Lessac consonant energy sounds, the same can be modeled, in part as time domain Dirac delta functions. In this context, the Dirac function would be spread by a functional factor related to the specific consonant sound and other elements of prosody.

In accordance with the precedent mentioned it is also contemplated that the Lessac concept of body energy is a useful tool for understanding speech and this understanding may be used to perform the text to speech conversion with improved realism. In particular, in accordance with Lessac body energy concepts, it is recognized that certain subjects and events arouse feelings and energies. For example, people get a certain feeling in anticipation of getting together with their families during, for example, the holiday season. Under certain circumstances this will be visibly observable in the gait, movement and swagger of the individual.

From a speech standpoint, two effects of such body energy can be modeled into the inventive system. First of all, the tendency of an individual to speak with a moderately increased pace and that they higher pitch can be introduced into the prosody in response to the use of artificial intelligence to detect the likelihood of body energy. In addition, depending upon the speech environment, such body energy may cause body movements which resulted in variations in speech. For example, an individual is at a party, and there is a high level of Lessac body energy, the individual may move his head from side to side resulting in amplitude and to a lesser extent pitch variations. This can be introduced into the model in the form of random parameters operating within predefined boundaries determined by artificial intelligence. In connection with the invention, it is noted that whenever reference is made to random variations or the introduction of a random factor into a particular element of prosody, the same may always be introduced into the model in the form of random parameters operating within predefined boundaries determined by the system.

Instead of a uniform methodology, this hybrid approach enables the system to pick the one structure that is the information theoretic optimum for each sound. By information theoretic optimum, in accordance with the invention it is believed the sound of minimum entropy using the traditional entropy measurement of information theory [as described by Gallagher] is the information theoretic optimum.

The digital filtering phase of the processing begins with the selection of phonemes, di-phones, M-ary phonemes or other recorded sounds from the audio signal library based on prior processing. Each sound is then properly temporally spaced based upon the text mark up from the above described prior rule processing and then further filtered based on instructions from the prior rule processing.

The following list indicates the types of filters and parameters that may be included.

The effectiveness of filtering is a relatively subjective matter. In addition, different filtering systems may react radically differently for different voices. Accordingly, the selection of optimum filtering is best performed through trial and error, although prior art techniques represent a good first cut solution to a speech filtering operation. In accordance with the invention it is believed that a time warp filter may be used to adjust the tempo of speech. A bandpass filter is a good means of adjusting pitch. Frequency translation can be used to change speaker quality, that is to say, a smoothing filter will provide speech continuity. In addition, in accordance with the present invention, it is contemplated that filters may be cascaded to accommodate multiple parameter requirements.

In accordance with a present invention, it is contemplated that the spoken output will be achieved by sending the filtered audio signal directly to a digital audio player. Standard audio signal formats will be used as output, thus reducing costs.

Figure 2:
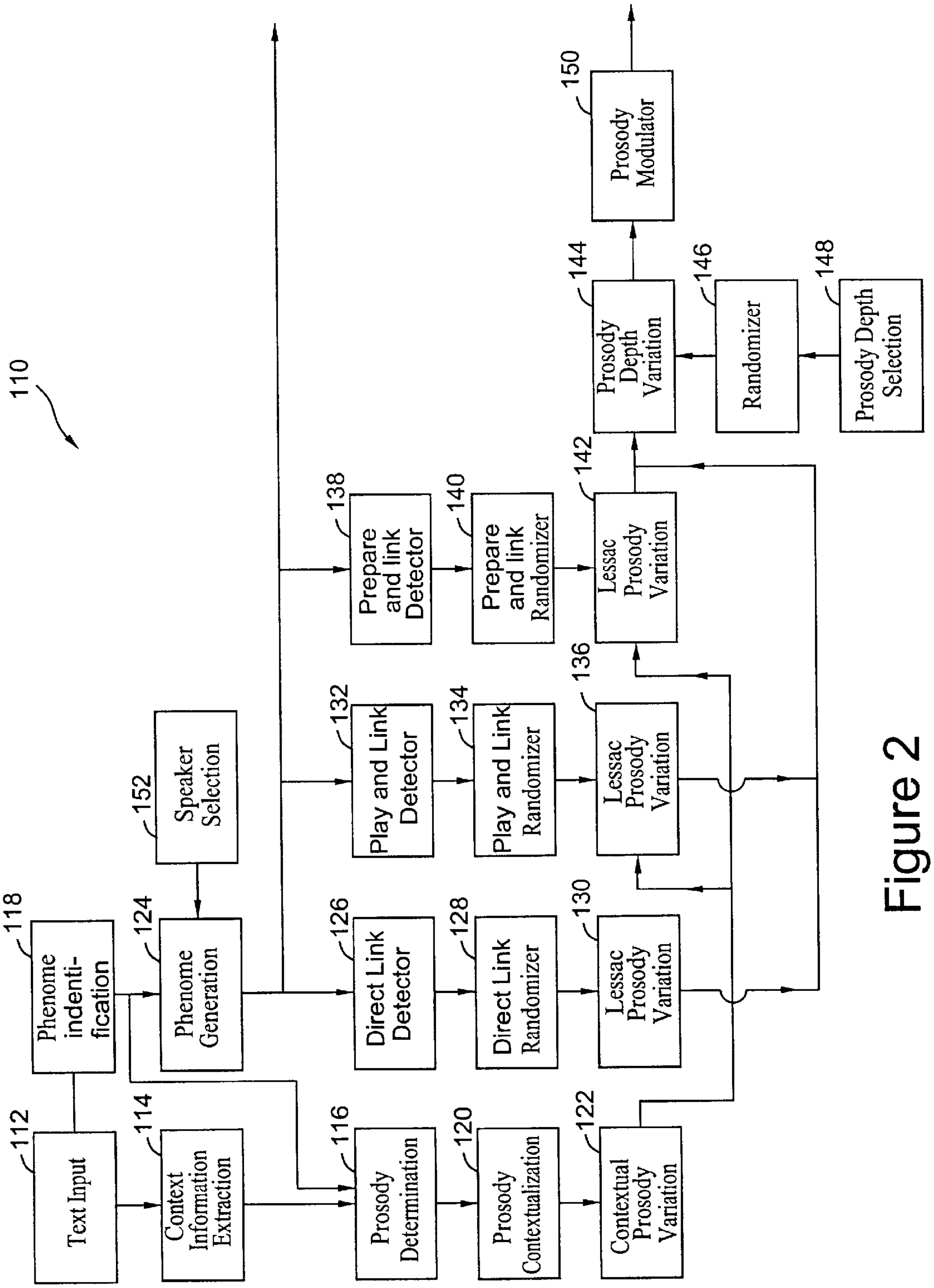
FIG. 2 illustrates a text to speech system implementing three Lessac rules.
Figure 3:
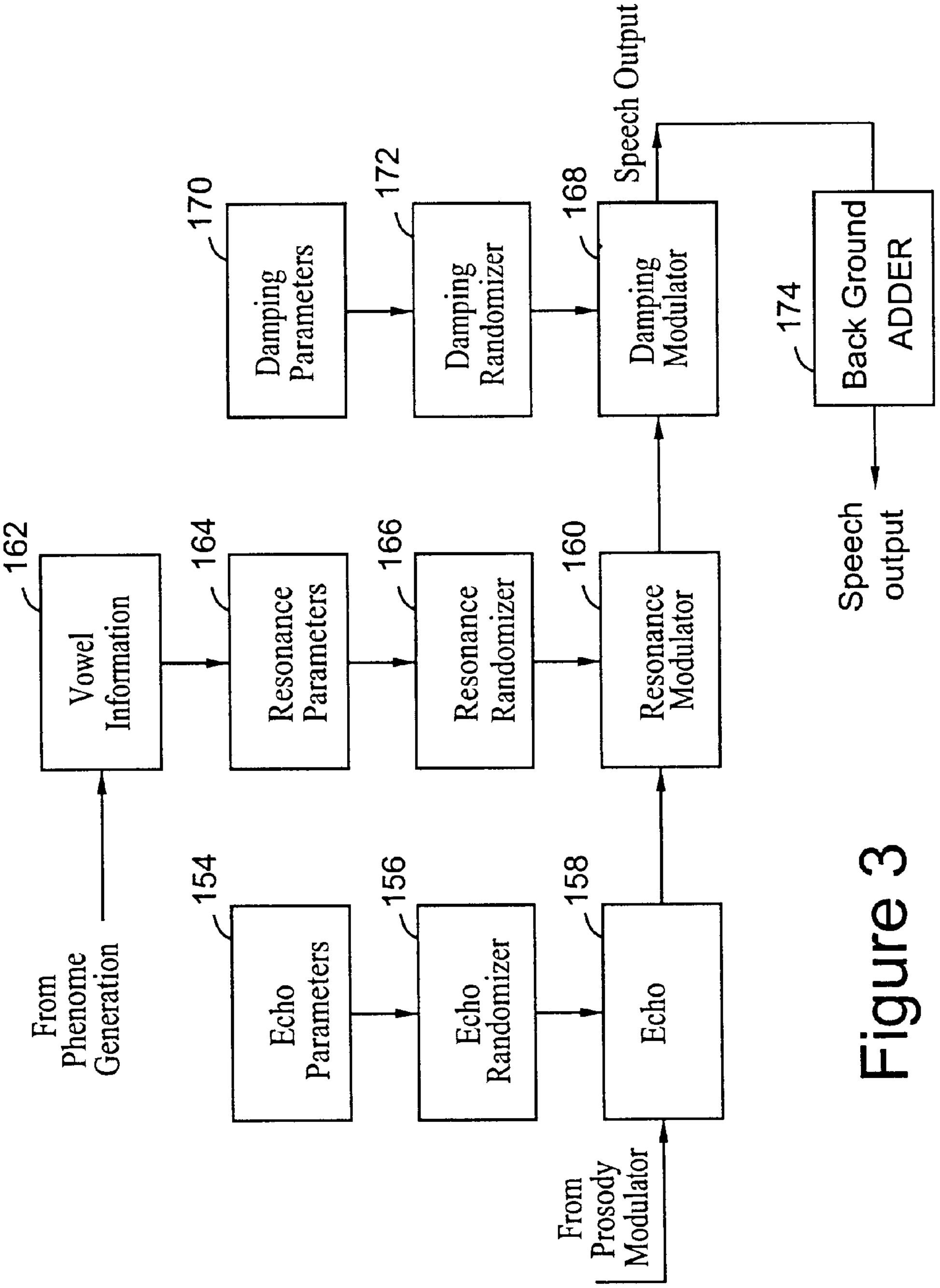
FIG. 3 illustrates a filtering system to be used to process the prosody output from the system of FIG. 2.

Turning to FIGS. 2 and 3, a particularly advantageous embodiment of a text to speech processing method 110 constructed in accordance with the present invention is illustrated. Method 110 starts with the input, at step 112, of text which is to be turned into speech. Text is subjected to artificial intelligence algorithms at step 114 to determine context and general informational content, to the extent that a relatively simple artificial intelligence processing method will generate such informational content. For example, the existence of a question may be determined by the presence of a question mark in the text. This has a particular effect on the prosody of the phonemes which comprise the various sounds represented by the text, as noted above.

At step 116, the prosody of the phonemes in the text, which are derived from the text at step 118, is determined and a prosody record created. The prosody record created at step 116 is based on the particular word as its pronunciation is defined in the dictionary. The text with the context information associated with it is then, at step 120 used to determine the prosody associated with a particular element of the text in the context in the text. This contextual prosody determination (such as that which would be given by a question mark in a sentence), results in additional information which is used to augment the prosody record created at step 118.

In accordance with the invention, the prosody of the elements of text are assigned quantitative values relating to pitch and duration at step 118. The values generated at step 118 are then varied at step 120. Accordingly, step 118 is said to generate an augmented prosody record because it contains base information respecting prosody for each word varied by contextual prosody information.

However, in accordance with the present invention, the mechanical feeling of uniform rules based prosody is eliminated to the use of random variation of the prosody numbers output by the system. Nationally, the range of random variation must be moderate enough so as not to extend quantitative prosody values into the values which would be associated with incorrect prosody. However, even mild variations in prosody are very detectable by the human ear. Consider, for example, the obviousness of even a slightly sour note in a singer's delivery. Thus, without varying prosody so much as to destroy easy understanding of meaning in the output speech signal, prosody may be varied to achieve a nonmechanical output speech signal. Such variation of the quantitative values in the prosody record is implemented at step 122.

Phonemes, which are identified at step 118, must, in addition to identification information output at step 118, be associated with sound information. Such sound information takes the form of standardized sound information. In accordance with the preferred embodiment of the invention, prosody information is used to vary duration and pitch from the standardized sound information. Such sound information for each phoneme is generated at step 124.

In accordance with the preferred embodiment of the invention, sound information may be obtained through any number of means known in the art. For example, the system may simply have a collection of spoken sounds recorded from a human voice and called up from memory by the system. Alternatively, the system may generate sounds based on theoretical, experimentally derived or machine synthesized phonemes, so-called half phonemes, or phoneme attack, middle and decay envelope portions and the oscillatory energy which defines the various portions of the envelope for each phoneme.

While, in accordance with the embodiment of the invention which will be detailed below, these sounds, or more precisely the rules and associated quantitative values for generating these sounds, may be varied in accordance with Lessac rules, application of Lessac rules may be implemented by storing different forms of each phoneme, depending upon whether the phoneme is the pending portion of an initial phoneme or the beginning portion of a terminal phoneme, and selecting the appropriate form of the phoneme as suggested by the operative Lessac rule, as will be discussed in detailed below.

The sound information for the sequence of phonemes which, in the preferred embodiment takes the form of phoneme identification information and associated pitch, duration, and voice information, is sent to the Lessac direct link detector at step 126.

To understand the concept of the Lessac direct link, Under Lessac theory, after the individual has learned the specific sensations of an individual consonant or consonant blend such as "ts" as in "hits", he/she learns to apply that musical feel or playing to words, then sentences, then whole paragraphs, then extemporaneously in everyday life. There are specific guidelines for the "playing" of consonants in connected speech. The same rules apply within a single word as well. Those rules include, for example: A final consonant can be linked directly to any vowel at the beginning of the next word, as in:

far above (can be thought of as one word, i.e. farabove)
grab it
stop up
bad actor
breathe in
that's enough
this is it This is called direct linking.

When the sequence of two phonemes requires a direct link under Lessac theory, the same is detected at step 126. In accordance with Lessac theory, the quantitative values associated with each of the phonemes are modified to produce the correct sound. Such direct link modification is output by the system at step 126. However, at step 128 the degree of modification, instead of being made exactly the same in every case, is randomized. The objective is natural sounding text to speech rather than mechanical uniformity and faithfulness to input models. Accordingly, at step 128 an additional degree of modification is introduced into the quantitative values associated with the phonemes and the system generates a randomized Lessac-dictated sound in the form of a sound identification and associated quantitative prosody bundled with other parameters.

At step 130, the randomized Lessac-dictated sound in the form of sound identification and associated quantitative prosody bundled with other parameters is then modified live the output prosody record generated at step 122.

Similarly, another pronunciation modification recognized under Lessac theory is the so-called play and link. Back-to-back consonants that are formed at totally different contact points in the mouth can be played fully. For example, black tie, the K (tom-tom) beat is formed by the back of the tongue springing away from the soft palate and the T snare drum beat is formed by the tip of the tongue springing away from the gum ridge-two totally different contact points-so the K can be fully played (or completed) before the T is tapped. The same principle applies to "love knot", where the V cello and the N violin are made in two different places in the mouth. Other examples would be:

sob sister
keep this
stand back
take time
smooth surface
stack pack
can't be
hill country/ask not why
understand patience This type of linking is called play and link.

Thus, when the sequence of two phonemes requires a play and link under Lessac theory, the same is detected at step 132. In accordance with Lessac theory, the quantitative values associated with each of the phonemes are modified to produce the correct sound. Such play and link modification is output by the system at step 132. At step 134 the degree of modification, instead of being made exactly the same in every case, is randomized in order to meet the objective of natural sounding text to speech. Accordingly, at step 134 an additional degree of modification is introduced into the quantitative values associated with the phonemes and the system generates a randomized Lessac-dictated sound in the form of a sound identification and associated quantitative prosody bundled with other parameters.

At step 136, the randomized Lessac-dictated sound in the form of sound identification and associated quantitative prosody bundled with other parameters is then modified by the output prosody record generated at step 122.

Another pronunciation modification recognized under Lessac theory is the so-called prepare and link. Some consonants are formed at the same or nearly the same contact point in the mouth. This is true for identical consonants and cognates. Cognates are two consonants made in the same place and in the same way, one voiced, the other unvoiced. See Table 2.

| | | | |
|---|---|---|---|
| Identical | stab back | help pack | |
| Cognates | bribe paid | keep back | sit down |

In these cases, the individual prepares and implodes the first consonant—that is, the lips or tongue actively takes the position for the first consonant—but only fully executes the second one. The preparation keeps the first consonant from being merely dropped.

This prepared action will also take place when the two consonants are semi-related meaning their contact points are made at nearly the same place in the mouth:

stab me
help me
good news
that seems good
red zone
did that

Semi-related consonants are only related when they occur as a drumbeat followed by a sustainable type consonant. When they are reversed:

"push down", for instance, the relationship disappears, and they are simply Play and Link opportunities.

This type of linking is called prepare and link.

The effect of these three linking components is to facilitate effortless flow of one word to another as natural sounding speech. The same effect is produced within a word.

Accordingly, when the sequence of two phonemes requires a prepare and link under Lessac theory, the same is detected at step 138. In accordance with Lessac theory, the quantitative values associated with each of the phonemes are modified to produce the correct sound. Such play and link modification is output by the system at step 138. At step 140 the degree of modification, instead of being made exactly the same in every case, is randomized in order to meet the objective of natural sounding text to speech. Accordingly, at step 140 an additional degree of modification is introduced into the quantitative values associated with the phonemes and the system generates a randomized Lessac-dictated sound in the form of a sound identification and associated quantitative prosody bundled with other parameters.

At step 142, the randomized Lessac-dictated sound in the form of sound identification and associated quantitative prosody bundled with other parameters is then modified by the output prosody record generated at step 122.

As will be understood from the above description of the Lessac rules, proceed variation can only occur at step 130, step 136 or step 142, because a sequence of two phonemes can be subject to only one of the rules in the group consisting of the direct link rule, the play and link rule, and the prepare and link rule.

In accordance with the present invention, the depth of prosody variation may also be varied. This should not be confused with random variations. In particular, random variations within a given range may be applied to quantitative prosody values. However, the range may be changed resulting in greater depth in the variation. Changes in a range of a random prosody variation may take several forms. For example, the variation is a normal or bell-curve distribution, the depth of prosody variation may take the form of varying the quantitative value of the peak of the bell curve, and/or varying the width of the bell curve.

Of course, variation may follow any rule or rules which destroy uniformity, such as random bell curve distribution, other random distributions, pseudo random variation and so forth.

In particular, prosody may be varied at step 144 in response to a random input by the system at step 146. In addition, at step 148 the depth may be subjected to manual overrides and/or manual selection of bell curve center point, bell curve width or the like.

The sound identification information and bundled prosody and other parameters present in the system after the performance of step 144 is then sent to a prosody modulator which generates a speech signal at step 150.

In a manner similar to the prosody depth selection manually input into the system at step 148, the system, in accordance with a present invention also contemplates variation in the phoneme selection to simulate different speakers, such as a male speaker, a female speaker, a mature female speaker, a young male speaker, a mature male speaker with an accent from a foreign language, and so forth. This may be done at step 152.

In accordance with the invention increased realism is given to the system by considering potential aspects of speech in the real world. This may involve a certain amount of echo which is present to a limited extent in almost all environments. Echo parameters are set at step 154. At step 156 these are subjected to a randomization, to simulate for example, a speaker who is moving his head in one direction or another or walking about as he speaks. Echo is then added to the system in accordance with the randomized parameters at step 158.

The signal generated at step 158 is then allowed to resonate in a manner which simulates the varying sizes to vocal cavity consisting of lungs, trachea, throat and mouth. The size of this cavity generally varies in accordance with the vowel in the phoneme. For example, the vowel "i" generally is spoken with a small vocal cavity, while the letter "a" generally is produced with a large vocal cavity.

Resonance is introduced into the system at step 160 where the center frequency for resonance is varied in accordance with vowel information generated at step 162. This vowel information is used to control resonance parameters at step 164. This may be used to affect the desired the Y-buzz and a-Y buzz, for example. In addition, randomization may be introduced at step 166. In connection with the invention, it is generally noted that any step for adding randomization may be eliminated, although some degree of randomization is believed to be effective and desirable in all of the various places where it has been shown in the drawings.

The signal generated at step 160 is then damped in a manner which simulates the dampening effect of the tissues which form the vocal cavity. The damping effect of the tissues of this cavity generally varies in accordance with the frequency of the sound.

Damping is introduced into the system at step 168. Damping parameters are set at step 170 and may optionally be subjected to randomization at step 172 where final damping information is provided. This damping information is used to control damping implemented at step 168.

Finally, at step 174, background noise may be added to the speech output by the system. Such background noise may be white noise, music, other speech at much lower amplitude levels, and so forth.

Accordance with the present invention, it is contemplated that artificial intelligence will be used to determine when pauses in speech are appropriate. These bosses may be increased, when necessary and in the bosses used to make decisions respecting the text to speech operation. In addition, smoothing filters may be employed between speech breaks identified by consonant energy drumbeats, as this term is defined by Lessac. These drumbeats demark segments of continuous speech. The use of smoothing filters will make the speech within these segments sound continuous and not blocky per existing methods.

In addition, more conventional filtering, such as attenuation of bass, treble and midrange audio frequencies may be used to affect the overall pitch of the output speech in much the same manner as a conventional stereo receiver used for entertainment purposes.

Figure 4:
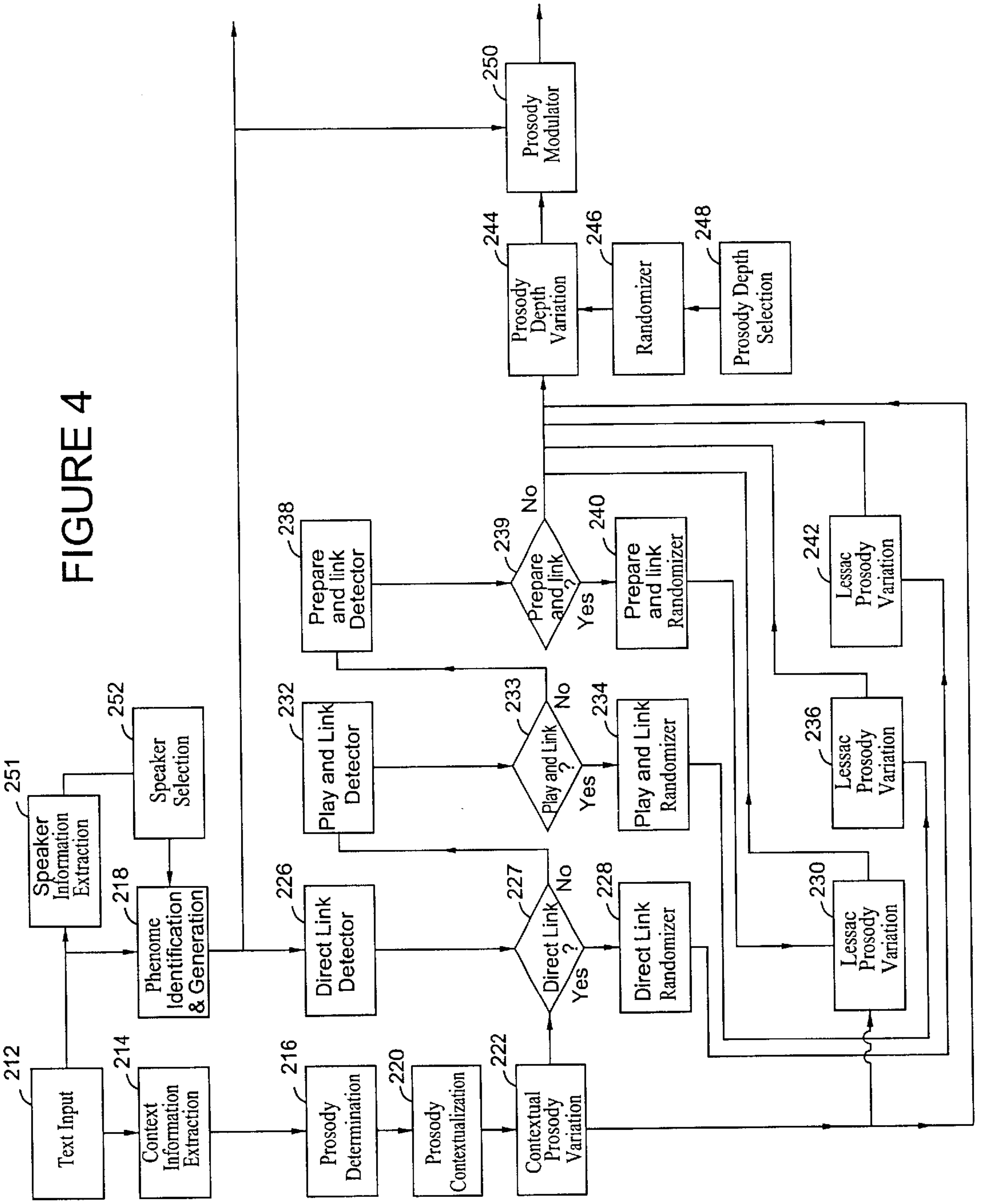
FIG. 4 illustrates a text to speech system similar to that illustrated FIG. 2 with the added feature of speaker differentiation.

Turning to FIG. 4, an alternative embodiment of a text to speech processing method 210 constructed in accordance with the present invention is illustrated. Method 210 starts with the input, at step 212, of text which is to be turned into speech. Text is subjected to artificial intelligence algorithms at step 214 to determine context and general informational content, to the extent that a relatively simple artificial intelligence processing method will generate such informational content. For example, the existence of a question may be determined by the presence of a question mark in the text. This has a particular effect on the prosody of the phonemes which comprise the various sounds represented by the text, as noted above.

At step 216, the prosody of the phonemes in the text, which are derived, together with an identification of the phonemes and the sound of the phonemes, from the text at step 218, is determined and a prosody record created. The prosody record created at step 216 is based on the particular word as its pronunciation is defined in the dictionary. The text with the context information associated with it is then, at step 220 used to determine the prosody associated with a particular element of the text in the context in the text. This contextual prosody determination (such as that which would be given by a question mark in a sentence), results in additional information which is used to augment the prosody record created at step 218.

In accordance with the invention, the prosody of the elements of text are assigned quantitative values relating to pitch and duration at step 218. The values generated at step 218 are then varied at step 220. Accordingly, step 218 is said to generate an augmented prosody record because it contains base information respecting prosody for each word varied by contextual prosody information.

However, as in the previous embodiment, the mechanical feeling of uniform rules based prosody is eliminated to the use of random variation of the prosody numbers output by the system. The range of random variation must be moderate enough so as not to extend quantitative prosody values into the values which would be associated with incorrect prosody. In accordance with the invention, prosody is varied so as not to destroy easy understanding of meaning in the output speech signal, while still achieving a nonmechanical output speech signal. Such variation of the quantitative values in the prosody record is implemented at step 222.

Phonemes, which are identified at step 218, must, in addition to identification information output at step 218, be associated with sound information. Such sound information takes the form of standardized sound information. In accordance with the preferred embodiment of the invention, prosody information is used to vary duration and pitch from the standardized sound information. Such sound information for each phoneme is generated at step 218.

In accordance with the preferred embodiment of the invention, sound information may be obtained through any number of means known in the art. For example, the system may simply have a collection of spoken sounds recorded from a human voice and called up from memory by the system. Alternatively, the system may generate sounds based on theoretical, experimentally derived or machine synthesized phonemes, so-called half phonemes, or phoneme attack, middle and decay envelope portions and the oscillatory energies which define the various portions of the envelope for each phoneme.

The sound information for the sequence of phonemes which, in the preferred embodiment takes the form of phoneme identification information and associated pitch, duration, and voice information, is sent to the Lessac direct link detector at step 226.

When the sequence of two phonemes requires a direct link under Lessac theory, the same is detected at step 226. If a direct link is detected, the system proceeds at decision step 227 to step 228. In accordance with Lessac theory, the quantitative values associated with each of the phonemes are modified to produce the correct sound. Such direct link modification (or a different source phoneme modified by the above prosody variations) is output by the system at step 228. However, at step 228 the degree of modification, instead of being made exactly the same in every case, is randomized. The objective is natural sounding text to speech rather than mechanical uniformity and faithfulness to input models. Accordingly, at step 228 an additional degree of modification is introduced into the quantitative values associated with the phonemes and the system generates a randomized Lessac-dictated sound in the form of a sound identification and associated quantitative prosody bundled with other parameters.

At step 230, the randomized Lessac-dictated sound in the form of sound identification and associated quantitative prosody bundled with other parameters then modifies the output prosody record generated at step 222 and the modified record sent for optional prosody depth modulation at step 244.

If a direct link is not detected at step 226, the system proceeds at step 227 to step 232.

When the sequence of two phonemes requires a play and link under Lessac theory, the same is detected at step 232. If a play and link is detected, the system proceeds at decision step 233 to step 234. In accordance with Lessac theory, the quantitative values associated with each of the phonemes are modified to produce the correct sound. Such play and link modification (or a different source phoneme modified by the above prosody variations) is output by the system at step 232. At step 234 the degree of modification, instead of being made exactly the same in every case, is randomized in order to meet the objective of natural sounding text to speech.

Accordingly, at step 234 an additional degree of modification is introduced into the quantitative values associated with the phonemes and the system generates a randomized Lessac-dictated sound in the form of a sound identification and associated quantitative prosody bundled with other parameters.

At step 236, the randomized Lessac-dictated sound in the form of sound identification and associated quantitative prosody bundled with other parameters then modifies the output prosody record generated at step 222 and the modified record sent for optional prosody depth modulation at step 244.

If a play and link is not detected at step 232, the system proceeds at step 233 to step 238. Accordingly, when the sequence of two phonemes requires a prepare and link under Lessac theory, the same is detected at step 238. If a prepare and link is detected, the system proceeds at decision step 239 to step 246. In accordance with Lessac theory, the quantitative values associated with each of the phonemes are modified to produce the correct sound. Such play and link modification (or a different source phoneme modified by the above prosody variations) is output by the system at step 240. At step 240 the degree of modification, instead of being made exactly the same in every case, is randomized in order to meet the objective of natural sounding text to speech. Accordingly, at step 240 an additional degree of modification is introduced into the quantitative values associated with the phonemes and the system generates a randomized Lessac-dictated sound in the form of a sound identification and associated quantitative prosody bundled with other parameters.

At step 242, the randomized Lessac-dictated sound in the form of sound identification and associated quantitative prosody bundled with other parameters then modifies the output prosody record generated at step 222 and the modified record sent for optional prosody depth modulation at step 244.

If a prepare and link is not detected at step 238, the system proceeds at step 239 to step 244, where the prosody record and the phoneme, without Lessac modification are subjected to prosody depth variation.

In accordance with the present invention, prosody may be varied at step 244 in response to a random input by the system at step 246. In addition, at step 248 the depth may be subjected to manual overrides and/or manual selection of bell curve center point, bell curve width or the like.

The sound identification information and bundled prosody and other parameters present in the system after the performance of step 244 is then sent to a prosody modulator which generates a speech signal at step 250.

In a manner similar to the prosody depth selection manually input into the system at step 248, the system, in accordance with a present invention also contemplates variation in the phoneme selection to simulate different speakers, such as a male speaker, a female speaker, a mature female speaker, a young male speaker, a mature male speaker with an accent from a foreign language, and so forth. In accordance with the invention, it is contemplated that artificial intelligence or user inputs or combinations of the same may be used to determine the existence of dialogue. Because generally dialogue is between two speakers, and where this is the case, the system, by looking, for example, at quotation marks in a novel, can determine when one speaker is speaking and when the other speaker is speaking. Artificial intelligence may determine the sex of the speaker, for example by looking at the name of the speaker in the text looking at large portions of text to determine when a person is referred to sometimes by a family name and at other times by a full name. All this information can be extracted at step 251 and used to influence speaker selection at step 252. For example, the machine may make one of the speaker's speaking in a deep male voice, while the other speaker will speak in a melodious female voice.

Output text at step 250 may then be subjected to further processing as shown in FIG. 3.

Figure 5:
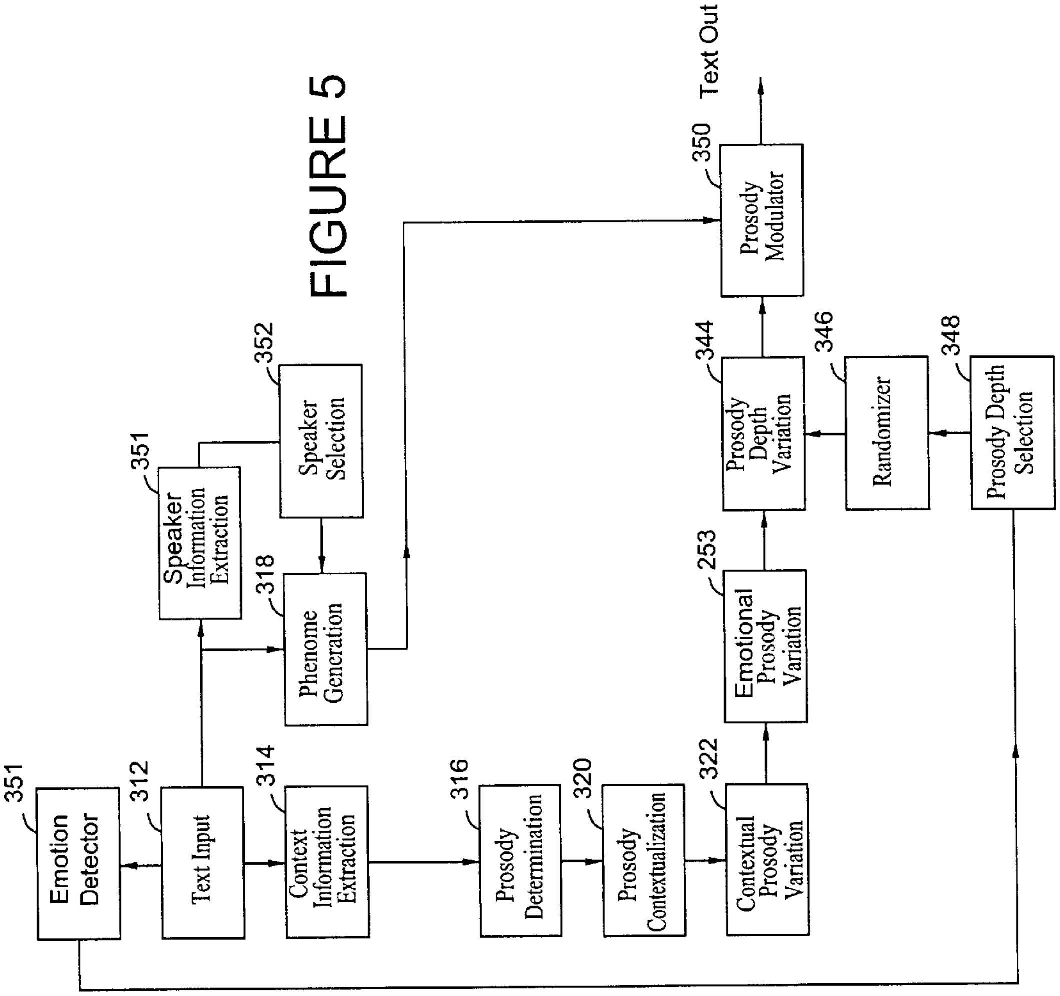
FIG. 5 illustrates a text to speech system in accordance with the invention for implementing emotion in output synthetic speech.

Turning to FIG. 5, an alternative embodiment of a text to speech processing method 310 constructed in accordance with the present invention is illustrated. Method 310 starts with the input, at step 312, of text which is to be turned into speech. Text is subjected to artificial intelligence algorithms at step 314 to determine context and general informational content, to the extent that a relatively simple artificial intelligence processing method will generate such informational content. This has a particular effect on the prosody of the phonemes which comprise the various sounds represented by the text, as noted above.

At step 316, the prosody of the phonemes in the text, which phonemes are derived, together with an identification of the phonemes and the sound of the phonemes, from the text at step 318, is determined and a prosody record created. The prosody record created at step 316 is based on the particular word as its pronunciation is defined in the dictionary. The text with the context information associated with it is then, at step 320 used to determine the prosody associated with a particular element of the text in the context in the text. This contextual prosody determination (such as that which would be given by a question mark in a sentence or a Lessac rule(implemented as in FIG. 4, for example)), results in additional information which is used to augment the prosody record created at step 318.

In accordance with the invention, the prosody of the elements of text are assigned quantitative values relating to pitch and duration at step 318. The values generated at step 318 are then varied at step 320. Accordingly, step 318 is said to generate an augmented prosody record because it contains base information respecting prosody for each word varied by contextual prosody information.

However, as in the previous embodiment, the mechanical feeling of uniform rules based prosody is eliminated to the use of random variation of the quantitative prosody values output by the system. The range of random variation must be moderate enough so as not to extend quantitative prosody values into the values which would be associated with incorrect prosody. In accordance with the invention, prosody is varied so as not to destroy easy understanding of meaning in the output speech signal, while still achieving a nonmechanical output speech signal. Such variation of the quantitative values in the prosody record is implemented at step 322.

Phonemes, which are identified at step 318, must, in addition to identification information output at step 318, be associated with sound information. Such sound information takes the form of standardized sound information. In accordance with the preferred embodiment of the invention, prosody information is used to vary duration and pitch from the standardized sound information. Such sound information for each phoneme is generated at step 318.

In accordance with the preferred embodiment of the invention, sound information may be obtained through any number of means known in the art. For example, the system may simply have a collection of spoken sounds recorded from a human voice and called up from memory by the system. Alternatively, the system may generate sounds based on theoretical, experimentally derived or machine synthesized phonemes, so-called half phonemes, or phoneme attack, middle and decay envelope portions and the oscillatory energies which define the various portions of the envelope for each phoneme.

The sound information for the sequence of phonemes which, in the preferred embodiment takes the form of phoneme identification information and associated pitch, duration, and voice information, optionally modified by Lessac link detection, as described above, is subjected to optional prosody depth modulation at step 344.

In accordance with the present invention, prosody may be varied at step 344 in response to a random input by the system at step 346. In addition, at step 348 the depth may be subjected to manual overrides and/or manual selection of bell curve center point, bell curve width or the like.

The sound identification information and bundled prosody and other parameters present in the system after the performance of step 344 is then sent to a prosody modulator which generates a speech signal at step 350.

In a manner similar to the prosody depth selection manually input into the system at step 348, the system, in accordance with a present invention also contemplates variation in the phoneme selection and/or quantitative prosody values to simulate emotion. This is achieved through the detection of the presence and frequency of certain words associated with various emotions, the presence of certain phrases and the like. In accordance with the invention, it is contemplated that artificial intelligence (or user inputs or combinations of the same to provide manual overrides) may be used to improve performance in this respect. All this information can be extracted at step 351 and used to generate prosody modification information that further modifies the augmented prosody record at step 253 to reflect the appropriate emotion, which is sent for prosody depth variation at step 344.

Output text at step 250 may then be subjected to further processing as shown in FIG. 3.

What is claimed is:

1. A method for converting text to speech using a computing device having memory, the method comprising:

(a) receiving text into said memory of said computing device;

(b) applying a set of lexical parsing rules to parse said text into a plurality of components;

(c) associating pronunciation and meaning information with said components;

(d) applying a set of phrase parsing rules to generate marked up text;

(e) phonetically parsing said marked up text using phonetic parsing rules;

(f) parsing said phonetically parsed marked up text using expressive parsing rules;

(g) storing a plurality of sounds in memory, each of said sounds being associated with said pronunciation information; and (h) recalling the sounds associated with said text to generate a raw speech signal from said marked up text after said parsing using phonetic and expressive parsing rules.

2. A method as claimed in claim 1, comprising filtering said raw speech signal to generate an output speech signal.

3. A method as claimed in claim 2 wherein said filtering of said amended sound information comprises: introducing echo; passing said amended sound information through an analog or digital resonant circuit wherein the resonance characteristics are keyed to vowel information; damping said amended sound information; or two or more of said filtering techniques.

4. A method as claimed in claim 1 comprising (i) associating with each of said phonemes a prosody record based on a database of prosody records associated with a plurality of words;

(j) applying a first set of artificial intelligence rules to determine context information associated with said text; and (k) for each of said phonemes:

(i) determining context influenced prosody changes;

(ii) applying a second set of rules to determine speech-training derived prosody changes;

(iii) amending the prosody record in response to said context influenced prosody changes and said speech-training derived prosody changes;

(iv) reading from said memory sound information associated with said phonemes; and (v) amending said sound information based on the prosody record as amended in response to said context influenced prosody changes and said speech-training derived prosody changes to generate amended sound information.

5. A method for converting text to speech as claimed in claim 4, wherein the prosody of said speech signal is varied to increase realism in said speech signal.

6. A method for converting text to speech as claimed in claim 4, wherein the prosody of said speech signal is varied in a manner which is random or pseudorandom to increase realism in said speech signal.

7. A method for converting text to speech as claimed in claim 4, wherein said sound information is associated with different speakers, and a set of artificial intelligence rules is used to determine the identity of the speaker associated with the sound information to be output.

8. A method of converting text to speech as claimed in claim 4, wherein said amending of the prosody record in response to said context influenced prosody changes is based on the words in said text and their sequence.

9. A method of converting text to speech as claimed in claim 4, wherein said amending of the prosody record in response to said context influenced prosody changes is based on the emotional context of words in said text.

10. A method as claimed in claim 4, further comprising adding background sound logically consistent with the context of said text in response to artificial intelligence rules operating on said text and/or in response to a human input.

11. A method as claimed in claim 1 wherein the received text comprises a plurality of words and the method further comprises:

(l) deriving a plurality of phonemes from said text;

(m) associating with each of said phonemes a prosody record based on a database of prosody records associated with a plurality of words;

(n) applying a first set of the artificial intelligence rules to determine context information associated with said text;

(o) determining prosody changes for each of said phonemes to generate determined prosody changes;

(p) reading from said memory sound information associated with said phonemes;

(q) amending said sound information based on the prosody record as amended in response to said determined prosody changes, optionally by varying the duration and pitch of said sound information;

(r) varying said determined prosody changes in said speech signal in a manner which is random or pseudorandom to achieve increased realism in output speech; and (s) outputting said sound information to generate a speech signal.

12. A method as claimed in claim 11 comprising employing associated context information to determine the prosody associated with a particular element of the text in the context in the text to augment the prosody record.

13. A method as claimed in claim 12 comprising assigning quantitative values relating to pitch and duration to the prosody of the text elements and varying the quantitative prosody values.

14. A method as claimed in claim 13 comprising randomly varying the prosody values within a range avoiding inappropriate prosody and, optionally, to provide a nonmechanical output sound without compromising easy understanding of meaning in the output speech signal.

15. A method as claimed in claim 11 wherein the random or pseudo-random prosody variations are varied within a given range and, optionally, the method comprises varying the depth of prosody variation by varying the given range.

16. A method as claimed in claim 11 wherein the range of random or pseudorandom prosody variation has a normal or bell-curve distribution and variations in the range of random prosody variation comprise varying the quantitative value of the peak of the bell curve, and/or varying the width of the bell curve optionally with manual selection of bell curve variation parameters including the bell curve center point and the bell curve width.

17. A method as claimed in claim 11 comprising outputting the sound identification information and prosody values to a prosody modulator and employing the prosody modulator to generate the output speech signal.

18. A method as claimed in claim 1 wherein the expressive parser rules are based on speech training theory and are obtained from a database.

19. A method as claimed in claim 1 wherein the parsing with expressive parsing rules identifies one or more expressive parsing elements selected from the group consisting of: voiced and unvoiced consonant "drumbeats"; tonal energy locations in the word list; structural "vowel" sounds within words in the word list, and phoneme connectives.

20. A method as claimed in claim 1 wherein the expressive parsing rules include pragmatic rules to enhance the spoken voice realism of the text to speech output, the pragmatic rules optionally being employed to determine one or more parameters selected from the group consisting of speaker identity, emotion, emphasis, speed and pitch.

21. A method as claimed in claim 20 wherein the pragmatic rules incorporate contextual and setting information and the method comprises expressing the pragmatic rules by modification of voice filtering parameters.

22. A method as claimed in claim 20 comprising generating three tokens for each word wherein the tokens are processed by the expressive rules processor and, optionally, wherein the three tokens comprise the English word, an English dictionary-provided phonetic description of the word and the output of a standard phonetic word parser for analyzing the word into phonetic elements.

23. A method as claimed in claim 20 comprising employing the expressive rules to quantify vowel sounds, optionally according to a degree of lip separation employed to vocalize the sound, and comprising employing the quantified vowel sounds to activate stored audio signals the strength of the vowel signal being selected according to the context of the vowel in the text.

24. A method as claimed in claim 1 wherein application of phrase parsing rules comprises determining punctuation and phrase boundaries and employing artificial intelligence to infer inflections, pauses or accenting from the phrase boundaries and punctuation marks.

25. A method as claimed in claim 1 wherein the input text comprises speech from multiple speakers and wherein the method comprises employing artificial intelligence to identify the individual speakers and to signal the computing system to change the speaker parameters when the speaker changes.

26. A method as claimed in claim 25 comprising varying the phoneme selection to simulate different speakers, the different speakers optionally being individually selected from the group consisting of male speakers, female speakers, mature female speakers, young male speakers and mature native foreign language speakers.

27. A method as claimed in claim 1 comprising identifying one or more musical instrument audio characteristics with each consonant portion of each word and associating each musical instrument audio characteristic with a stored audio signal suitable for subsequent filtering and processing and employing the respective stored audio signal to audibly express the respective consonant word portion.

28. A method as claimed in claim 1 comprising employing a database of sounds for playback, the sound database comprising sounds following speech training pronunciation rules and selecting particular sounds depending upon the sequence of phonemes identified in word syllables found in the input text to be transformed into speech.

29. A method as claimed in claim 1 comprising modeling body energy into the system by employing artificial intelligence to detect the appropriateness of body energy and introducing into the prosody a change of speech pace and a change of pitch in response to body energy detection or by employing artificial intelligence to introduce random parameters operating within predefined boundaries into a body energy model in response to detection of a speech environment conducive to body movements causing variations in speech.

30. A method as claimed in claim 1 comprising selecting from a choice of sounds an information theoretic low entropy sound to express a phoneme.

31. A method as claimed in claim 1 including employing a digital filtering phase and comprising selecting recorded sounds from the audio signal library in accordance with prior processing determinations wherein the filtering comprises one or more filters selected from the group consisting of a time warp filter to adjust the output speech tempo, a bandpass filter to adjust the output speech pitch, a frequency translation filter to change speaker quality, a smoothing filter to enhance speech continuity, and a cascade of multiple ones of the foregoing filters and optionally comprising playing the filtered output on a digital audio player to generate audible speech expressing the input text.

32. A method as claimed in claim 1 comprising modeling consonant energy sounds at least in part as time domain Dirac delta functions spread by a functional factor related to the specific consonant sound and to prosody elements.

33. A method as claimed in claim 1 comprising determining a prosody for the phonemes derived from the text and creating a prosody record comprising the determined prosody together with an identification of the phonemes and the sound of the phonemes, the prosody record optionally being derived from dictionary-defined pronunciations of each word in the text.

34. A method as claimed in claim 1 wherein the sounds stored in memory comprise a system collection of spoken sounds recorded from one or more human voices or from one or more system-generated sounds, the system-generated sounds optionally being selected from the group consisting of theoretical, experimentally derived and machine-synthesized phonemes, so-called half phonemes, phoneme attack, middle and decay envelope portions and the oscillatory energy which defines the various portions of the envelope for each phoneme.

35. A method as claimed in claim 1 comprising implementing the expressive parsing rules by storing different forms of each phoneme, the different forms optionally depending upon whether the phoneme is the pending portion of an initial phoneme or the beginning portion of a terminal phoneme, and selecting an appropriate form of the phoneme to provide a desired prosody.

36. A method as claimed in claim 1 comprising processing the output speech signal by performing one or more processing operations selected from the group consisting of: providing echo parameters to provide echo simulation; introducing resonance into the signal and controlling the resonance parameters in accordance with vowel information generated during said phonetic parsing; damping the output speech signal in accordance with the frequency of the sound; and adding a background noise to the speech output signal to simulate speaker background noise; wherein optionally at least one of the one or more output speech processing operations is randomized or pseudorandomized.

37. A method as claimed in claim 1 comprising employing filtering to attenuate bass, treble and/or midrange audio frequencies to selectively modify the pitch of the phonemes employed in the output speech to provide a desired prosody or expression.

38. A method as claimed in claim 1 comprising employing artificial intelligence to determine from the input text locations in the output speech where pauses are appropriate and inserting pauses in the determined locations.

39. A method as claimed in claim 1 comprising employing smoothing filters to smooth the speech signal in speech breaks identified by Lessac-defined consonant energy drumbeats.

40. A computerized system for converting text to speech comprising:

(a) a memory to receive text to be converted;

(b) a digital audio module to output a speech signal or audible speech; and (c) text to speech software comprising one or more software modules for:

(i) applying a set of lexical parsing rules to parse said text into a plurality of components;

(ii) associating pronunciation and meaning information with said components;

(iii) applying a set of phrase parsing rules to generate marked up text;

(iv) phonetically parsing said marked up text using phonetic parsing rules;

(v) parsing said phonetically parsed marked up text using expressive parsing rules;

(vi) storing a plurality of sounds in memory, each of said sounds being associated with said pronunciation information; and (vii) recalling the sounds associated with said text to generate a raw speech signal from said marked up text after said parsing using phonetic and expressive parsing rules.

* * * * *